June 30, 1942.   J. M. MELAND   2,288,010
FISH-CUTTING MACHINE
Filed May 7, 1941
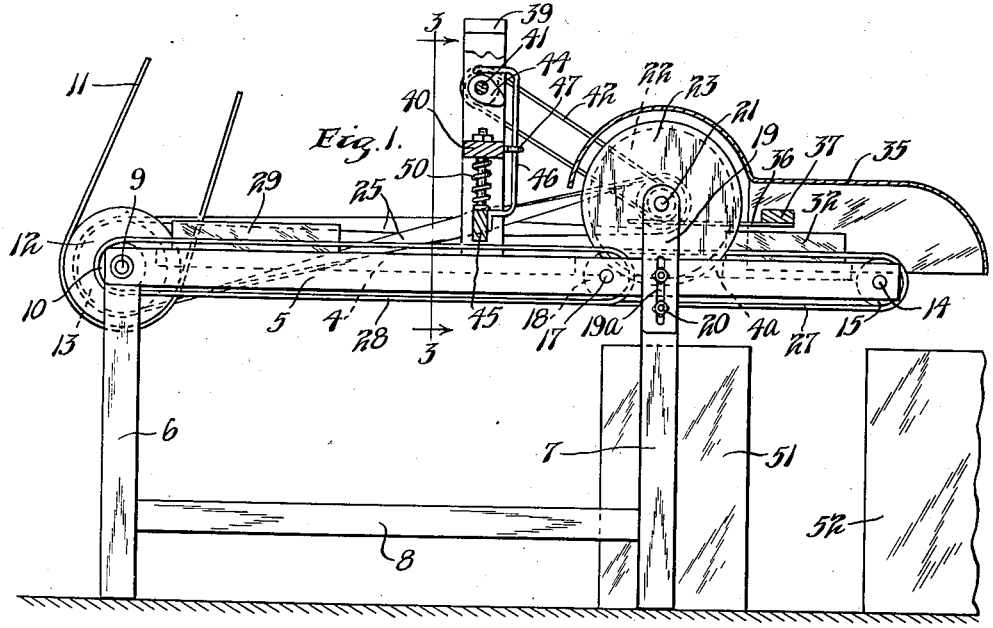
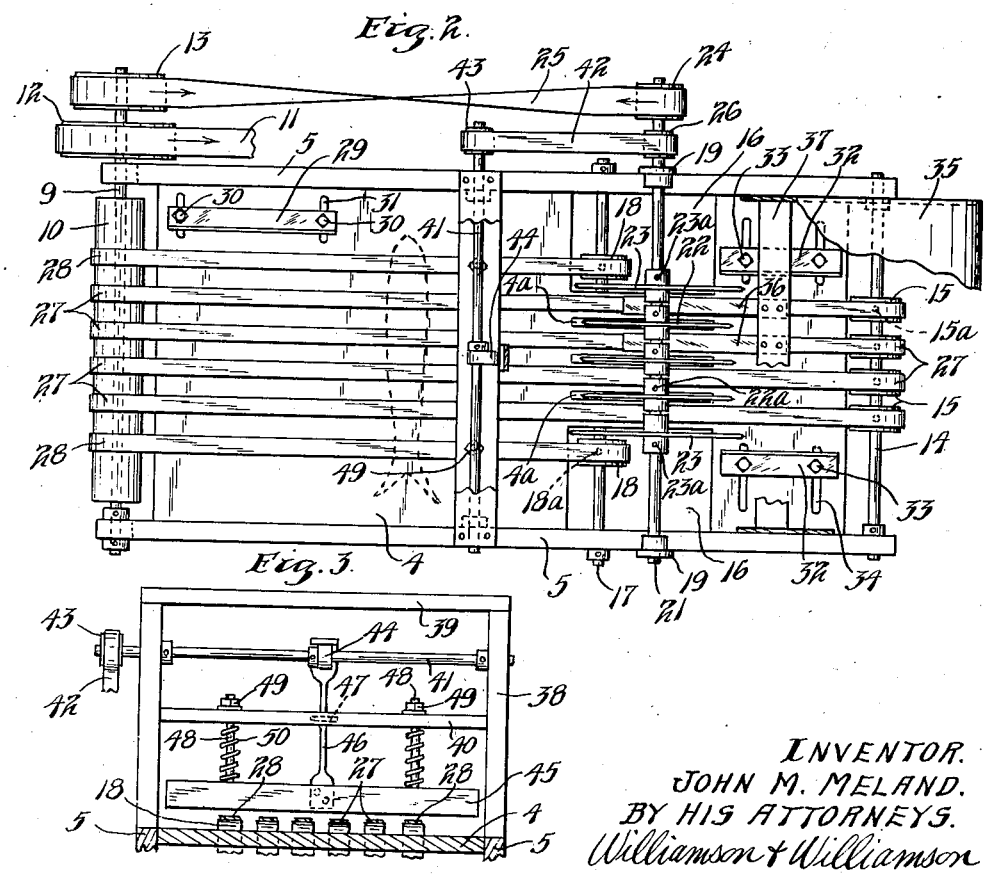
INVENTOR.
JOHN M. MELAND.
BY HIS ATTORNEYS.
Williamson & Williamson Patented June 30, 1942

2,288,010

UNITED STATES PATENT OFFICE 2,288,010

FISH CUTTING MACHINE

John M. Meland, Minneapolis, Minn.

Application May 7, 1941, Serial No. 392,241

8 Claims. (Cl. 17—4)

This invention relates to machines for cutting fish and other materials. It is intended particularly for the cutting of herring for pickling purposes.

It is one of the objects of the invention to provide a novel and improved machine for cutting fish and the like which is of cheap and simple construction and can be efficiently operated for sub-dividing the fish or the like into a number of parts.

Another object of the invention is to provide a novel and improved machine for cutting fish and the like including a plurality of spaced circular knives and means for carrying the fish into the knives, the knives being so arranged that as they work into the fish side slipping movement of the fish is prevented relative to the knives.

Another object is to provide in a fish cutting machine a plurality of circular knives, a plurality of belts carrying the fish to the knives and means for straightening the fish relative to the belts so that the fish will lie crosswise of the belts as they are carried to the knives.

Another object is to provide a fish cutting machine having a plurality of cutting discs to which the fish are carried, the outermost discs being adapted to cut off the heads and tails of the fish and the outermost discs being so arranged relative to the inner discs that they act first against the fish to prevent side slipping of the fish as the inner discs work into the same.

The objects and advantages of the invention will more fully appear from the following description made in connection with the accompanying drawing, wherein like reference characters refer to the same or similar parts throughout the views, and in which—

Fig. 1 is a view partly in side elevation and partly in vertical section through a fish cutting machine embodying the invention;

Fig. 2 is a plan view of the machine shown in Fig. 1, certain of the parts being broken away to more clearly illustrate other parts; and Fig. 3 is a vertical section taken substantially on the line 3—3 of Fig. 1 as indicated by the arrows.

In the illustrated embodiment of the invention a machine is shown adapted for use in the cutting of herring for pickling purposes. A machine is shown including a solid deck 4 of generally elongated rectangular shape having side bars 5 attached thereto and the side bars being secured to rear and forward legs 6 and 7 respectively and the legs at each side of the machine being interconnected by stringers 8. The deck 4 at the rear end of the machine, the left end as shown in Figs. 1 and 2 of the drawing, terminates short of the side bars 5 and extending between the two rear ends of the side bars and journaled therein is a rear shaft 9 carrying an elongated roller or belt pulley 10 between the two side bars, the said belt pulley being the equivalent mechanically of a multiplicity of individual belt pulleys. The shaft 9 is adapted to be driven as from an overhead shaft or motor (not illustrated) through the medium of an endless belt 11 working over a pulley 12 at the outer side of one of the two side bars 5. Outwardly from the pulley 12 the shaft 9 may be equipped with a driving pulley 13 for a purpose presently to appear.

The deck 4 terminates short of the forward ends of the side bars 5 as shown and a forward shaft 14 is journaled in the forward end portions of the two side bars 5 to extend between the same in parallelism with the shaft 9. This shaft 14 carries at its central portion a plurality of belt pulleys 15 (four of these belt pulleys being shown in the illustrated embodiment) and these belt pulleys 15 are adjustably secured to the shaft 14 as by means of countersunk set screws 15a so that the space between pulleys can be readily adjusted.

The deck 4 is provided with side notches 16 intermediate the two ends of the deck and preferably somewhat closer to the forward end of the deck than toward the rear end thereof. An intermediate shaft 17 is journaled in the two side bars 5 and in the central portion of the deck 4 to extend across the two notches 16 preferably nearer the rear portions thereof than nearer the forward portions and this intermediate shaft 17 preferably carries two belt pulleys 18 one disposed in each notch 16 of the deck. These pulleys 18 are also preferably adjustably secured to the shaft 17 as by countersunk set screws 18a so as to vary the position of these pulleys on the shaft. It should be stated that the shaft 17 runs parallel to the two shafts 9 and 14.

A pair of upstanding bearing brackets 19 are mounted for vertical adjustment relative to the deck 4 and forward posts 7 as by means of nutted bolts 20 attached to the posts and side bars 5 and projecting through slots 19a formed in these brackets 19. Journaled in the upper portions of the brackets 19 is a knife shaft 21 carrying a plurality (three in the illustrated embodiment) of circular intermediate cutting knives 22 and a pair of outer circular cutting knives 23. The intermediate knives 22 are of less diameter than the two outer knives 23 for a purpose presently to appear. The outer knives project into the notches 16 while the inner knives 22 are partially received within slots 4a formed in the deck 4 below the same. Each knife 22 and 23 has a central hub adjustably secured to the knife shaft 21 as by means of a set screw 22a or 23a respectively whereby the spacing between the various knives can be varied. In line with the pulley 13 and at the same side of the machine the knife shaft 21 carries a pulley 24 and a cross belt 25 runs over the two pulleys 13 and 24 whereby the knife shaft 21 may be driven from the rear shaft 9 but in an opposite direction therefrom. Inwardly from the pulley 24 the shaft 21 is provided with another pulley 26.

Inner endless belts 27 run over the pulley roller 10 carried by rear shaft 9 and the pulleys 15 carried by the forward shaft 14 and the upper runs of these belts work over the deck 4 and extend between adjacent knives carried by the knife shaft 21. In the illustrated embodiment the belts 27 are four in number and the upper runs of the two innermost belts work between adjacent intermediate knives 22 while the upper runs of the two outermost belts 27 work between the outer inner knives 22 and the outer knives 23.

A pair of endless belts 28 are provided which work over the belt roller 10 and the respective pulleys 18 on the intermediate shaft 17. These belts 28 are considerably shorter than the belts 27 and the upper runs of the belts 28 work over the decks 4, being disposed somewhat outwardly from the outer knives 23.

A gauge plate 29 consisting of an angle bar adjustably mounted in the deck 4 as by means of nutted bolts 30 received in slots 31 formed in the deck is located near the rear end of the deck adjacent one side thereof and it extends for a short distance longitudinally of the deck. This gauge plate 29 acts as an abutment plate against which the mouths of fish may be placed as they are fed onto the belts 27 and 28.

A pair of guide plates 32 are adjustably mounted on the deck 4 to extend substantially from between the notches 16 to the forward end of the deck. The guide plates 32 may be angle bars as shown adjustably mounted on the deck 4 as by means of nutted bolts 33 received within slots 34 formed in the deck. These guide plates 32 preferably extend longitudinally of the deck and are located preferably in rather close proximity to but outwardly from the position of the outer cutting discs 23.

A metal casing 35 is preferably secured to the forward portion of the deck 4 and this casing has a rear substantially semi-circular curved portion which extends over the knives 22 and 23 and it has a forward hood portion which overlies the forward portions of the upper runs of the inner belts 27, projects forwardly beyond the pulleys 15 and curves downwardly at its forward end.

To keep the cutting knives 22 and 23 clear of the material that is being cut a plurality of fingers 36 are provided between adjacent knives 22 and between the outer knives 22 and the knives 23 and these fingers are preferably located below the knife shaft 21 at a level above the deck 4 and they are secured at their forward ends to a cross bar 37 secured at its ends as to the casing 35. Secured to the side bars 5 of the machine in rearwardly spaced relation from the knives 22 and 23 is an upstanding rectangular frame consisting of the uprights 38 and upper and lower cross bars 39 and 40 respectively. A cam shaft 41 is journaled in the uprights 38 between the cross bars 39 and 40 to extend transversely of the machine and this cam shaft is adapted to be driven as from the knife shaft 21 by means of an endless belt 42 running over the pulley 26 and also running over a pulley 43 secured to an outer end of the cam shaft 41 in alignment with the pulley 26. Carried by the shaft 41 at an intermediate portion thereof is a single faced cam 44. A transverse straightening plate 45 is provided which may consist of merely a bar and this plate has centrally attached thereto an arm 46 which projects upwardly through an eye 47 carried by the cross bar 40 to extend above the level of the cam 44, said arm having a rearwardly projecting portion at its upper end which directly overlies the cam 44 to be acted on thereby. To guide the movement of the straightening bar 45 for vertical reciprocation, a pair of pins 48 are provided which are secured at their lower ends to the plate 45 and run upwardly through openings in the cross bar 40, these pins being equipped at their upper ends with screw threaded nuts 49 which act as adjusting heads for the pins to limit the down movement of the plate 45. Coiled pressure springs 50 surround the pins 48 and react between the plate 45 and the cross bar 40 and these springs resiliently urge the plate 45 downwardly toward the deck 4. With this arrangement it will be seen that as the shaft 41 rotates, the cam 44 acting on the arm 46, will at intervals raise the straightening plate 45 and it will further be seen that after the high point of the cam works past the cam contacting portion of the arm 46 the springs 48 will lower the straightening plate 45 to a position adjacent the upper runs of the belts 27 and 28. The cam 44 is so formed that the plate 45 will assume its lowermost position for most of the time.

In using the machine suitable vats or barrels 51 will be disposed below the two deck notches 16 for the purpose of receiving the heads and tails of the fish to be cut. Another vat or barrel 52 will be placed below the forward end of the machine to receive the cut sections of the fish other than the heads and tails. As the machine is set in operation the belt 11 will drive the rear shaft 9 in a clockwise direction, as viewed in Fig. 1, and, of course, the shafts 17 and 14 will be driven in a similar direction through the medium of the belts 27 and 28. The crossed belt 25 running over the two pulleys 13 and 24 will drive the knife shaft 21 in a counterclockwise direction, as viewed in Fig. 1, whereby the knives 22 and 23 will be driven in a similar direction. It is a matter of indifference as to the direction of rotation of the cam shaft 41 but in the illustrated embodiment the belt 42 working over the pulleys 26 and 43 will drive the cam shaft in a counterclockwise direction. The upper runs of the belts 27 and 28 will, of course, move from the rear end of the machine toward the forward end thereof.

In utilizing the machine for cutting fish such as herring into sections for pickling purposes, the machine operator will place the fish individually on the belts 27 and 28 near the rear end of the machine in such relation that the fish mouths will abut the gauge plate 29 and so that the fish lie approximately transversely of the machine. The gauge plate 29 is so adjusted relative to the sizes of the fish being cut that the heads of the fish extend approximately a length equal to the transverse spacing between the gauge plate 29 and the knife 23 at the same side of the machine as the gauge plate. The tails of the fish will then project somewhat beyond the outer edge of the belt 28 at the opposite side of the machine from the gauge plate 29. As the fish are laid on the belts 27 and 28 the belts advance the fish toward the knives 22 and 23. The straightening plate 45 as before explained has an intermittent upward and downward movement, remaining down adjacent the belts 27 and 28 most of the time. The up movement of the straightening plate 45 is sufficient to clear the fish lying on the belts 27 and 28 while in the down position of the plate 45 the plate obstructs the passage of the fish beyond the plate. Accordingly as a fish is fed forwardly on the belts 27 and 28 toward the knives, the fish strikes the straightening plate 45 and if the fish is not aligned exactly transversely of the deck 4 and of the belts 27 and 28 the plate 45 causes the fish to be so transversely aligned. The timing of the movement of the straightening plate 45 is such as to roughly coincide with the speed of the operator in placing fish on the carrying belts so that each fish is held for a moment relative to the movement of the belts by the straightening plate, whereupon as the plate rises the fish may be carried forwardly beyond the same into the rotary knives 22 and 23.

As a fish advances into the knives 22 and 23, the two outer knives 23 being of greater diameter than the inner knives 22 strike the fish first and work somewhat inwardly into the fish before the fish comes into contact with the inner knives 22. Then when the fish comes into contact with the inner knives 22 the outer knives have cut part way into the fish so as to hold the fish from side slip or side movement as the inner knives 22 strike the same. It has been found that if the outer knives 23 are made of the same diameter or smaller diameter than the inner knives 22 the fish slides transversely of the machine and generally somewhat diagonally of the machine as it strikes the knives which causes irregular and improper cutting of the fish. This may also be due partially to the fact that fish are somewhat broader at their intermediate portions than at their tail and head portions and if all the cutting knives are made of the same diameter the outer knives would tend to strike the fish first to tilt the fish out of a position extending exactly transversely of the carrying belts. One of the outer knives 23 severs the head from the fish and the head is discharged by the shorter belt 28 adjacent that knife through the adjacent notch 16 into the vat 51 underlying that notch. Similarly the other outer knife 23 severs the tail portion of the fish from the remainder of the fish and this tail portion is discharged by the adjacent shorter belt 28 through the notch 16 into the vat 51 underlying that notch. The intermediate portions of the fish are tranversely cut into sections by the inner knives 22 and they are carried by the longer belts 27 forwardly to discharge therefrom at the forward end of the machine into the vat 52. If the machine is run at rather high speed the intermediate sections of the fish tend to carry considerably beyond the forward portions of the belts 27 and the forward downturned part of the hood portion of the casing 35 directs fish sections downwardly into the vat 52.

The guide plates 32 are effective to prevent side spreading movement of the fish sections as they are carried by the belts 27 forwardly from the knives 22 and 23.

As the brackets 19 may be raised or lowered it is possible to raise or lower the knife shaft 21 and the knives 22 and 23 to vary the cutting angle as the knives stike the fish and to permit adjustment of the knives as edges thereof are worn off by sharpening.

By adjusting the pulleys 18 on the intermediate shaft 17 and by adjusting the outer knives 23 inwardly or outwardly on the knife shaft 21 and by adjusting the gauge plate 29, it is possible to accommodate the machine for proper cutting of fish of different lengths. Also limited adjustment of the intermediate knives 22 on the shaft 21 is possible as the slots 4a are somewhat wider than these knives so that the spacing between the intermediate knives can be varied within limits to vary somewhat the spacing between the cuts made by these knives. Of course, if the spacing between the knives 22 is varied to any considerable extent it may be necessary to vary the spacing between the pulleys 15 on the forward shaft 14 and this is, of course, possible. The guide plates 32 are also adjustable on the deck 4 to properly accommodate them to the adjustment of the other parts.

It will be seen that a highly effective machine has been provided for quickly cutting up fish. While the machine is intended primarily for use in cutting such fish as herring for pickling purposes, it will be readily seen that the machine may be used for cutting or dividing many other types of goods such as meat, plastic material, etc.

It will, of course, be understood that various changes may be made in the form, details, arrangement and proportions of the various parts without departure from the scope of the present invention which generally stated consists in the matter shown and described and set forth in the appended claims.

What is claimed is:

1. A machine for cutting fish and the like comprising a frame having forward and rear ends, forward and rear pulley shafts rotatably mounted in parallelism at the two ends of the frame, pulleys carried by said forward and rear shafts, spaced endless belts working over the pulleys on the two shafts, a knife shaft mounted for rotation above said belts, a plurality of inner circular knives carried by said knife shaft in spaced relation, a pair of outer circular knives also carried by said knife shaft and spaced outwardly respectively from the outermost of the inner knives, said outer knives being of greater diameter than the inner knives, said inner knives being adapted to work between adjacent belts and the outer knives being adapted to work at the outer edges of the outermost belts, means for driving one of said pulley shafts and means for driving said knife shaft.

2. A machine for cutting fish and the like comprising a deck having a forward end and a rear end, said deck being notched at its sides intermediate its forward and rear ends, a pulley shaft journaled at the rear end of said deck, a forward pulley shaft journaled at the forward end of said deck, an intermediate pulley shaft journaled at the intermediate portion of said deck to extend across said notches, pulley means carried by said rear pulley shaft, a plurality of pulleys carried by said forward pulley shaft and a pair of pulleys carried in the respective deck notches by said intermediate pulley shaft and laterally disposed from the pulleys carried by said forward pulley shaft, a plurality of long endless belts working over said pulley means on said rear shaft and the pulleys on said forward shaft and having upper runs working over said decks, a pair of shorter endless belts working over said pulley means on said rear shaft and said pulleys on said intermediate shaft and having upper runs working over said deck, a knife shaft journaled above said deck at the intermediate portion thereof, inner circular knives carried by said knife shaft and working between the upper runs of adjacent long belts and a pair of circular knives of larger diameter than the first mentioned knives and carried by said knife shaft and working respectively between the upper runs of the shorter belts and the adjacent longer belts, means for driving said knife shaft and means for driving said rear pulley shaft.

3. A machine for cutting fish and the like comprising a frame, a forward and rear shaft journaled in said frame, pulleys carried by said forward and rear shafts, endless belts having spaced parallel upper runs and working over the said pulleys, a shaft journaled above the intermediate portion of said frame, a plurality of circular knives carried by said last mentioned shaft and working between the upper runs of adjacent belts, all of said shafts being disposed in parallel relation, and means extending crosswise of said belts intermittently working upwardly and downwardly to and from the top runs of said belts for contacting fish and the like fed onto the belts to straighten the same and cause them to project crosswise of the belts prior to advancing to said knives, means for driving said shaft carrying said knives, and means for driving one of said first mentioned shafts.

4. A machine for cutting fish and the like comprising a table having a rear end and a forward end, said table having lateral openings intermediate the forward and rear ends thereof, a rear pulley shaft journaled at the rear end of said table, a forward pulley shaft journaled at the forward end of said table and an intermediate pulley shaft journaled in the intermediate portion of said table, a multiple pulley carried by said rear pulley shaft, a plurality of pulleys carried by said forward pulley shaft and a pair of pulleys carried by said intermediate pulley shaft and working respectively within said openings, a plurality of long endless belts running over said multiple pulley and the pulleys on said forward pulley shaft and having upper runs working over the top of said table, a pair of shorter endless belts working over said multiple pulley and said pulleys on said intermediate shaft and having upper runs working over the top of the table, a knife shaft journaled above the intermediate portion of said table, a plurality of inner knives of circular shape carried by said knife shaft and respectively working between adjacent long belts and a pair of circular knives carried by said knife shaft and of greater diameter than the first mentioned knives and respectively working between said shorter belts and the longer belts most closely adjacent thereto, means for driving said knife shaft and means for driving said rear pulley shaft.

5. The structure defined in claim 4, a cross bar mounted for reciprocation above said belts to the rear of said knives, resilient means normally urging said cross bar downwardly toward the upper runs of said belts and means operating at timed intervals for raising said cross bar well above the upper runs of said belts.

6. A machine for cutting fish and the like comprising a table having a rear end and a forward end, said table having lateral openings intermediate the forward and rear ends thereof, a rear pulley shaft journaled at the rear end of said table, a forward pulley shaft journaled at the forward end of said table and an intermediate pulley shaft journaled in the intermediate portion of said table, a multiple pulley carried by said rear pulley shaft, a plurality of pulleys carried by said forward pulley shaft and a pair of pulleys carried by said intermediate pulley shaft and working respectively within said openings, a plurality of long endless belts running over said multiple pulley and the pulleys on said forward pulley shaft and having upper runs working over the top of said table, a pair of shorter endless belts working over said multiple pulley and said pulleys on said intermediate shaft and having upper runs working over the top of the table, a knife shaft journaled above the intermediate portion of said table, a plurality of inner knives of circular shape carried by said knife shaft and respectively working between adjacent long belts and a pair of circular knives carried by said knife shaft and of greater diameter than the first mentioned knives and respectively working between said shorter belts and the longer belts most closely adjacent thereto, means for driving said knife shaft, means for driving said rear pulley shaft, and side guides carried by said table adjacent the forward end of the same and located between said knife shaft and said forward pulley shaft.

7. In a machine for cutting fish and the like and including cutting knives and a plurality of belts carrying the fish or the like to the same, a device for straightening the fish or the like comprising a bar mounted crosswise of the belts above the same for vertical reciprocation, resilient means urging said bar downwardly toward the belts and means for raising said bar upwardly well above the belts at regular timed intervals.

8. A machine for cutting fish and the like comprising a frame, a rear pulley shaft mounted at one end of the frame, a front pulley shaft mounted at the other end of the frame, an intermediate pulley shaft mounted on an intermediate portion of the frame, said shafts being disposed in parallel relation, belt pulleys mounted on each of said shafts, said intermediate pulley shaft having at least one belt pulley laterally disposed relative to the pulleys on said forward shaft, long endless belts working over the pulleys of said rear and forward shafts, a shorter belt working over the pulley of said intermediate shaft and one of the pulleys of the rear shaft, a knife shaft mounted above the upper runs of said belts forward of said intermediate shaft and a plurality of knives carried by said knife shaft and projecting downwardly below the upper runs of said belts and means for driving said knife shaft and said pulley shafts, the knife mounted on said knife shaft and working between said shorter belt and the next adjacent long belt being of greater diameter than other knives to act in advance of the other knives on material carried to the knives by said belts.

JOHN M. MELAND.